Aug. 8, 1950 A. P. JAHN 2,518,327
METHOD AND MEANS FOR DETECTING LEAKS IN LEAD
SHEATH TELEPHONE CABLES
Filed Jan. 20, 1947

INVENTOR
A. P. JAHN
BY J. MacDonald
ATTORNEY

Patented Aug. 8, 1950

2,518,327

UNITED STATES PATENT OFFICE 2,518,327

METHOD AND MEANS FOR DETECTING LEAKS IN LEAD SHEATH TELEPHONE CABLES

Alfred P. Jahn, Summit, N. J., assignor to Bell Telephone Laboratories, Incorporated, New York, N. Y., a corporation of New York Application January 20, 1947, Serial No. 723,072

2 Claims. (Cl. 250—83.6)

This invention relates to the locating of leaks in lead sheath cables and more particularly to the locating of leaks in lead sheathed multiconductor communication cables which may be located either underground or in the air and which may or may not be normally maintained under gas pressure.

This invention is also applicable to the detecting of leaks in lead sheath communication cables of the aforementioned type.

This invention is also applicable for locating the position of a buried cable and also for determining the path of the cable.

The object of this invention is the provision of a method and means for locating leaks in the sheaths of lead-covered communication cables.

Another object of the invention is the provision of a method and means for detecting leaks in buried communication cables which eliminates the necessity for excavating and exposing long lengths of the cable.

A further object of the invention is the provision of a method and means for locating the position and path of a buried lead-covered communication cable.

In the maintenance and operation of communication circuits, which utilize a plurality of paper insulated conductors enclosed in a lead sheath, it is essential that moisture be prevented from entering the cable through openings in the sheath which have been caused by abrasion or mechanical injury. It has been found that by maintaining cables under gas pressure, that is, filling the cable with an inert gas such as nitrogen, under a pressure of from 6 to 9 pounds per square inch, that when breaks occur in the sheath the escaping gas will prevent the entrance of moisture at that point. However, to determine the location of the leak is a time-consuming job since pressure readings must be made along the length of the cable and computations made to determine the approximate location of the leak. The sheath must then be examined minutely to locate the leak. There have been many suggestions made and tried out to reduce the time consumed in locating such leaks and also to more accurately determine the location of said leaks but to date no better method has been evolved than that which is now standard practice with the communication companies which necessitate the use, among other expensive equipment, of fragile measuring devices.

In the case of leaks in lead-covered cables, which are not maintained under pressure, the location of the leak is not usually discovered until the conductors have been damaged by the entrance of moisture and the consequent putting out of service one or more circuits in the cable. The location of the break in the lead sheath of the cable is determined by elaborate electrical measurements which are both time-consuming and expensive with the possibility that more circuits may be put out of service before the leak is finally located and the sheath repaired.

In the method and means which form the subject-matter of this invention, sheath breaks in all types of lead-covered cable may be located in a relatively short time and may be used with equal success on all types of lead-covered cable, whether aerial or buried, pressurized or not under pressure.

The method and means of locating leaks in lead sheath cable in accordance with my invention, make use of a radioactive gas and a highly sensitive detecting instrument, for example, the well-known Geiger counter, and comprises the introduction into the cable, through suitable valves, etc. a gas containing a suitable radioactive material or introducing into the gas already in the cable, when the cable is normally gas-filled, a radioactive material. The gas will flow through the cable under pressure and when there is a break in the lead sheath it will escape into the air or into the ground, as in the case of buried cable, and cause an emission of radioactive energy which will be picked up by a highly sensitive detecting device such as a Geiger counter. The Geiger counter is a well-known instrument for detecting single ionizing particles from radioactivated elements, for example ultra-violet rays, X-ray generators, X-ray sources and cosmic sources and has been found to be particularly suitable for use in the present invention.

In the present invention the radioactive material, which may be introduced into the gas already in the cable or introduced into a gas before it is introduced into the cable, will emit both beta and gamma rays. The beta rays, being in the form of electrons, will not pass through the lead sheath of the cable, while the gamma rays having a comparatively short wavelength will pass through the lead sheath. It is the purpose of this invention to make use of both of these rays and to employ detecting devices which are susceptible to either or both types of rays, since the gamma rays which pass through the lead sheath of the cable may be detected and employed to locate the cable in the ground and to follow its path, and will show a greater intensity at the break due to the concentration of the rays at this point, while the beta rays having mass and being in the form of electrons will not pass through the lead sheath of the cable, but will be emitted only at the break in the sheath. Thus it will be observed that in locating a buried cable and finding the break in the sheath, both the beta and gamma rays may be utilized, while in an aerial cable it will be necessary only to employ the beta rays since the path of the cable and its location is known.

Any suitable radioactive material which will emit either or both beta and gamma rays may be employed, it has been determined that radio-activated carbon 13 oxidized into $CO_2$ will work satisfactorily.

The invention will be more clearly understood from the following detailed description when read in connection with the drawings of which:

Figure 1:
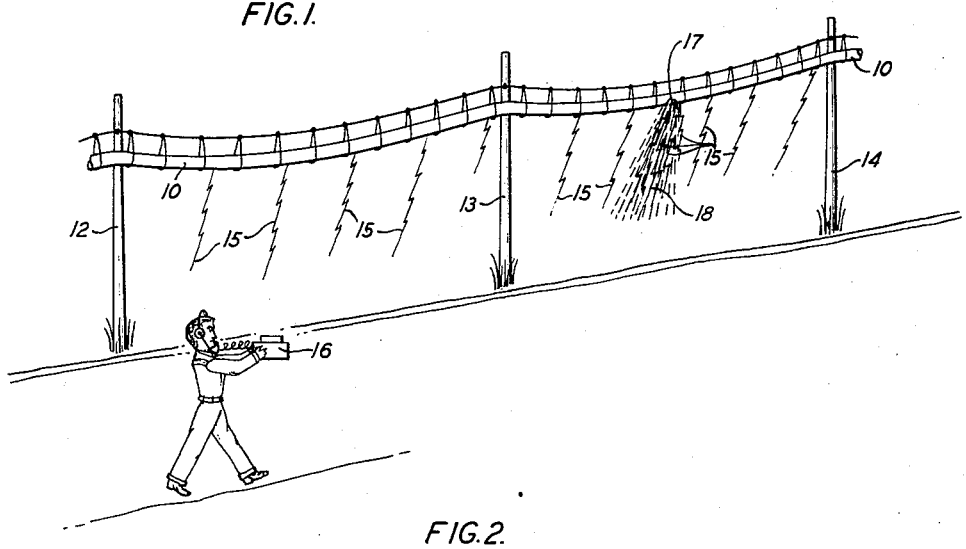
Fig. 1 is a fragmentary section of a pole line supporting a lead sheath aerial cable having a radioactive gas therein and an observer checking the cable for breaks in the sheath.
Figure 2:
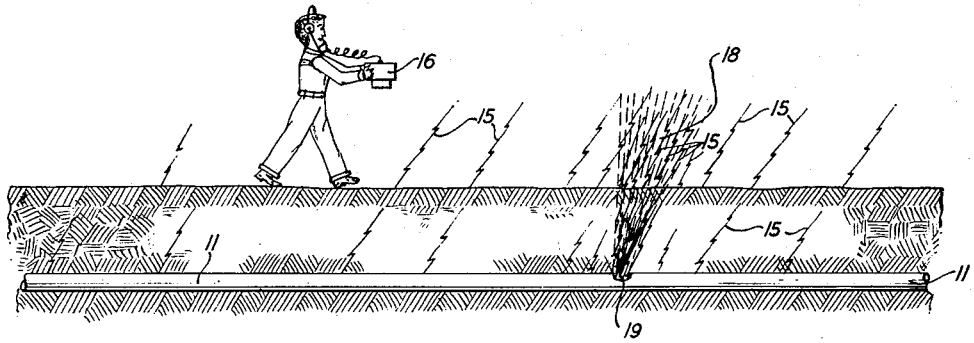
Fig. 2 is a fragmentary section of an underground lead sheath cable with an observer following the path of the cable by the emission of the gamma rays and checking for leaks in the sheath by an emission of concentration of gamma rays and also an emission of the beta rays.

In accordance with one form of this invention I introduce into a lead sheath cable, which may be the aerial cable shown at 10 in Fig. 1, or the buried cable 11 of Fig. 2, a suitable radioactive material. In those instances where the cable is normally maintained under gas pressure I introduce the radioactive material directly into the gas which is being supplied to the cable to maintain it under pressure by any suitable means (not shown) and in those instances where the cable is not maintained under gas pressure I introduced a radioactive gas into the cable by any of the well-known means for introducing an inert gas into a cable.

While any suitable radioactive material may be employed, I have determined that any radioactivated material which will emit either or both beta and gamma rays, introduced directly into the gas-filled cable or into a gas which will be introduced under pressure into the cable will give highly satisfactory results.

As shown in Fig. 1, the aerial cable 10 is supported on the poles 12, 13 and 14 in the well-known manner and contain a radioactive gas under pressure which will emit gamma rays 15 along its length due to the fact that these rays will readily pass through the lead sheath of the cable, but inasmuch as these rays are emitting uniformly and with a mild intensity along the entire length of the cable it will indicate on the detecting device 16 a uniform emission. However, when the detecting device 16 encounters a strong concentration of gamma rays such as at the breaks 17 in the sheath 10 it will indicate the concentration of these rays and therefore determine the exact location of the break in the lead sheath. At the same time the emission of the beta rays 18 which do not pass through the sheath 10, but emit only at the break in the cable sheath, will also act on the detecting device 16 and also indicate the exact location of the break.

The device 16 may contain a Geiger counter or other suitable detecting device susceptible to both beta and gamma rays and since the location of the cable is known, may contain a detecting device susceptible only to beta rays. The device 16 may contain various switching devices and means for suitably shielding the detecting means and may have associated therewith means for audibly and visually indicating the presence of both beta and gamma rays.

As shown in Fig. 2 there is illustrated the device 16 being employed to determine the location, in the ground, of the cable 11, by means of the emission of the gamma rays 15, which, as heretofore explained, pass through the sheath of the lead cable and into the ground and will be picked up by the device 16, and will locate the break in the sheath of the cable 10, as at 19, by the concentrated emission of the gamma rays 15 and the emission of the beta rays 18.

Figure 3:
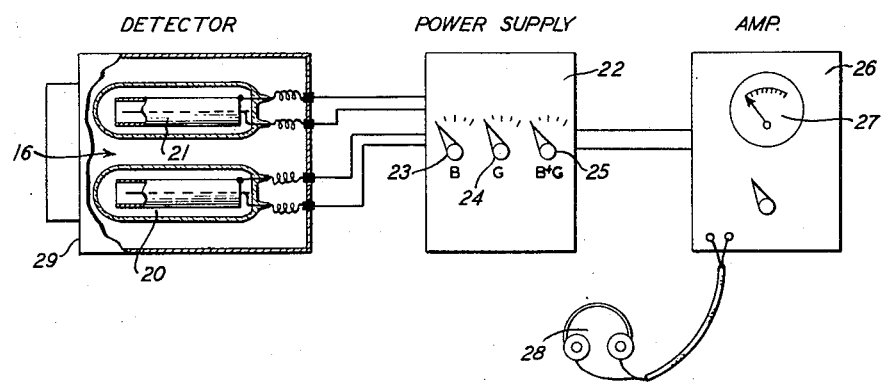
Fig. 3 illustrates schematically a suitable device for detecting the beta and gamma rays and giving both audible and visual indications.

In Fig. 3 I have shown schematically a suitable device 16 for detecting the radiation from the gas-filled cables of this invention, together with a suitable power supply and amplifier.

The device 16, comprising a housing 29 having mounted therein a pair of detector tubes 20 and 21 which are capable of picking up radiation from radioactive sources, these tubes are mounted in such a manner that they are exposed to the radiation of rays which emit from the gas-filled cables 10 and 11. The tubes 20 and 21 are connected to a suitable power supply contained in the housing 22, and control knobs 23, 24 and 25 associated with the power supply controls the energization of either of the tubes 20 or 21 or both of them. The tube 20 is responsive to beta rays and the tube 21 to gamma rays and by means of the control knobs which operate suitable switches (not shown) in the power supply, either of the tubes or both of them may be put into operation.

In order that the presence of rays radiating from the cable may be readily observed, a suitable amplifier 26 is provided which is connected to the power supply 22 and has associated therewith a meter 27 and a set of ear-phones 28 for visually and audibly indicating the presence of radio waves.

While I have shown and described the preferred form of my invention it is to be understood that I am not limited to any particular type of radioactive material or to any particular type of detecting device and that I am only limited by the scope of the appended claims.

What is claimed is:

1. An instrument for detecting the presence of rays emitted from a radioactivated gas which comprises, a housing, a pair of detecting devices located in said housing, each responsive to a particular type of ray, each of said detecting devices connected independently to a source of power and switching means in said power source for selectively energizing either one or both of said detecting devices.

2. An instrument for detecting the presence of rays emitted from a radioactivated gas which comprises, a housing, a pair of detecting devices located in said housing, one responsive to a beta type of ray and the other to a gamma type of ray, each of said detecting devices connected independently to a source of power, and switching means in said power supply for selectively operating either one or both of said detecting devices and audible and visual indicating means associated therewith.

ALFRED P. JAHN.

(References on following page)

REFERENCES CITED

The following references are of record in the file of this patent:

UNITED STATES PATENTS

| Number | Name | Date |
|---|---|---|
| 2,345,043 | Mysels | Apr. 4, 1944 |
| 2,390,433 | Fearon | Dec. 4, 1945 |
| 2,429,577 | French | Oct. 21, 1947 |

OTHER REFERENCES

Evans: Medical Physics, Otto Glasser, editor, 1944, Year Book Publishers, Inc., Chicago.

Ruben and Kamen: Article in Physical Review, 1941, vol. 59, pp. 349–354.

Livingood and Seaborg: Review of Modern Physics, vol. 12, pp. 30–34, Jan. 1940.